United States Patent
Bobier et al.

(10) Patent No.: US 6,901,246 B2
(45) Date of Patent: May 31, 2005

(54) SUPPRESSED CYCLE BASED CARRIER MODULATION USING AMPLITUDE MODULATION

(75) Inventors: Joseph Bobier, Cudjoe Key, FL (US); Nadeem Khan, Cudjoe Key, FL (US)

(73) Assignee: XG Technology, LLC, Sarasota, FL (US)

( * ) Notice: Subject to any disclaimer, the term of this patent is extended or adjusted under 35 U.S.C. 154(b) by 288 days.

(21) Appl. No.: 09/916,054

(22) Filed: Jul. 26, 2001

(65) Prior Publication Data

US 2002/0058484 A1 May 16, 2002

Related U.S. Application Data

(60) Provisional application No. 60/238,759, filed on Oct. 6, 2000.

(51) Int. Cl.[7] .............................. H03C 1/52; H04B 1/02
(52) U.S. Cl. ........................... 455/108; 455/74; 455/93; 455/109; 455/46; 455/47; 455/114.1; 455/258; 375/238; 375/268; 375/271; 375/272; 375/269; 375/273
(58) Field of Search ......................... 455/108, 91, 127, 455/255, 257, 258, 93, 74, 47, 109; 375/268, 271, 270, 272, 273, 295, 296, 300, 381, 106, 315, 314, 286, 287; 332/149, 162

(56) References Cited

U.S. PATENT DOCUMENTS

| | | | | |
|---|---|---|---|---|
| 5,465,396 A | * | 11/1995 | Hunsinger et al. | 455/61 |
| 5,588,023 A | * | 12/1996 | Ho | 375/238 |
| 5,789,979 A | * | 8/1998 | Kumar et al. | 330/149 |
| 5,812,672 A | * | 9/1998 | Herre et al. | 381/2 |
| 5,838,210 A | * | 11/1998 | Midya et al. | 332/109 |
| 5,867,064 A | * | 2/1999 | Van Horn et al. | 330/149 |
| 5,886,573 A | * | 3/1999 | Kolanek | 330/10 |
| 5,910,752 A | * | 6/1999 | Filipovic et al. | 329/341 |
| 6,011,816 A | * | 1/2000 | Sanielevici et al. | 375/324 |
| 6,073,050 A | * | 6/2000 | Griffith | 607/57 |
| 6,147,553 A | * | 11/2000 | Kolanek | 330/10 |
| 6,167,241 A | * | 12/2000 | Thornton | 455/109 |
| 6,278,686 B1 | * | 8/2001 | Alard | 370/204 |
| 6,636,566 B1 | * | 10/2003 | Roberts et al. | 375/247 |
| 6,665,348 B1 | * | 12/2003 | Feher | 375/259 |
| 6,700,939 B1 | * | 3/2004 | McCorkle et al. | 375/295 |
| 6,717,992 B2 | * | 4/2004 | Cowie et al. | 375/316 |

* cited by examiner

*Primary Examiner*—Marceau Milord
(74) *Attorney, Agent, or Firm*—Dennis L. Cook, Esq.

(57) ABSTRACT

A sinusoidal RF carrier is modulated for the transmission of digital binary data streams through the amplitude suppression of carrier wavelets. These wavelets are defined between zero crossover positions representing zero energy locations. This modulation is accomplished when the carrier is slightly amplitude modulated with a modulation signal that is equal in frequency to the carrier itself and the modulation always begins or ends upon the exact zero voltage crossing point of the RF cycle phase. The modulation is applied as a slight shift of the amplitude of any single cycle, each cycle representing a single bit of data. A single cycle of RF will either represent a "1" or "0" depending upon the amplitude of the cycle, relative to other adjacent cycles in the same carrier.

21 Claims, 9 Drawing Sheets

SUPPRESSED CYCLE BASED CARRIER MODULATION USING AMPLITUDE MODULATION

CROSS-REFERENCE TO RELATED APPLICATION

The present application claims the benefit of previously filed co-pending Provisional Patent Application, Ser. No. 60/238,759 filed on Oct. 6, 2000.

FIELD OF THE INVENTION

This invention relates, generally, to methods for wireless transmission of data, and more specifically, to a radio frequency (RF) signal and to a carrier modulation method of generating the signal wherein the suppressed amplitude of the carrier signal for a cycle is used to indicate a binary zero or one, and the unsuppressed amplitude of a cycle indicates the opposite binary number, resulting in a RF signal and method of modulation that allows for high-speed data transmission that produces very little sideband energy.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:

1—Frequency Division Multiple Access (FDMA)
2—Time Division Multiple Access (TDMA)
3—Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

While binary data stream transmission by wire has improved substantially in terms of data transfer rates, that improvement has not been the case where transmission is by utilization of the RF spectrum. The transmission inefficiencies occasioned with the modulation of an RF carrier have remained to the extent that an efficient, high-speed transmission of binary information utilizing an RF carrier remains as an elusive goal of those skilled in the art.

BRIEF SUMMARY OF THE INVENTION

The present invention is addressed to a RF signal and method wherein digital data streams are radio transmitted at a high level of efficiency and speed, and without a large continuous concomitant formation of side frequency phenomena. Thus, bandwidths assigned for this transmissional task are quite narrow, with data transmission speeds at the singular frequency of the RF carrier itself. This invention can send high speed data in RF channels that are very narrow and that would ordinarily be considered useful only for very low speed data or analog voice. This invention can also be used with multiple access systems.

In patent application Ser. No. 09/511,470 filed by Joseph Bobier (a co-inventor of this patent application), the contents of which are incorporated herein, a new method of carrier modulation referred to as "missing cycle modulation" (MCM) was disclosed. That method of modulation uses an RF carrier comprised of a continuum of full cycle sinusoidal wavelets extending between zero crossover points or positions, and that carrier is then modulated to carry binary information by selectively deleting one or a succession of carrier wavelets. Such a deletion may be assigned to represent either a binary one or zero value. The deletional modulation is carried out by the removal, by switching, of data related wavelets at the sinusoidal zero crossing positions defining them.

Inasmuch as these zero positions correspond with the absence of electro-magnetic wave energy, no wave disturbances are invoked which, would in turn, produce side frequencies. As a consequence, the assigned carrier frequencies may be quite close together in value to provide a substantially improved utilization of the radio spectrum for binary data transmittal.

In the present invention the deletional modulation of the original invention is modified to merely suppress the amplitude of the cycle resulting in suppressed cycle modulation (SCM). This modulation is accomplished when the carrier is amplitude modulated with a modulation signal that is equal in frequency to the carrier itself and the modulation always begins or ends upon the exact zero voltage crossing point of the RF cycle phase. The modulation is applied as a shift of the amplitude of any single cycle, each cycle representing a single bit of data. In SCM, each individual RF cycle represents one bit of data. A single cycle of RF will either represent a "1" or "0" depending upon the amplitude of the cycle, relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely, a cycle that is relatively lower in amplitude than other cycles in the bit stream might be considered to represent a "0".

In general, an assembly for transmitting a data stream of binary information would employ a local oscillator, or other means, to generate a RF carrier to be transmitted. The crossover positions defining wavelets of the carrier are then identified and are synchronized with the binary data of the data stream. A carrier modulator, which suppresses carrier wavelets in correspondence with the binary data being transmitted is used to modulate the carrier. Amplification of the modulated RF carrier for antenna-based transmission or broadcast is carried out using a non-resonating amplification architecture, such as a Class A amplification stage.

The receiver is designed to receive SCM binary radio signals and output them as a TTL compatible serial data stream. An assembly for receiving a data stream of binary information would employ a pre-selector that consists of a tuned antenna that is connected to a series tuned band-pass circuit that will reject signals outside the desired pass band. Amplification of the received signal using Class A Amplifiers would be required along with a low pass filter to eliminate any unwanted signals. A circuit to isolate or "clip" the positive voltage portion of the signal and provide amplification of that portion of the signal would then be used along with additional amplification to allow for easier differentiation between the two logic states. A sample and hold (S/H) circuit then receives and rectifies the signal, resulting in a filtered pulse, which represents RF pulses of the higher amplitude and excludes those of the lower amplitude, thus differentiating between the two logical states insinuated by this particular modulation scheme. A class B squaring amplifier is then used essentially as an "overdriven" amplifier. This amplifier receives the single binary pulses from the S/H circuit and amplifies them to or near the supply voltage, thus clipping at the maximum supply voltage. This cleans up the signal pattern and provides a squarer signal. Finally, a TTL compatible output circuit performs additional squaring and inversion of the signal logic twice, which results in the original logic polarity after two stages of squaring.

Both the transmission and receiving assemblies could be easily modified by those skilled in the art to implement this invention using compatible multiple access systems.

The invention accordingly, comprises the RF signal and the methods possessing the steps, which are exemplified in the following detailed description.

For a fuller understanding of the nature and objects of the invention, reference should be made to the following detailed description taken in connection with the accompanying drawings.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
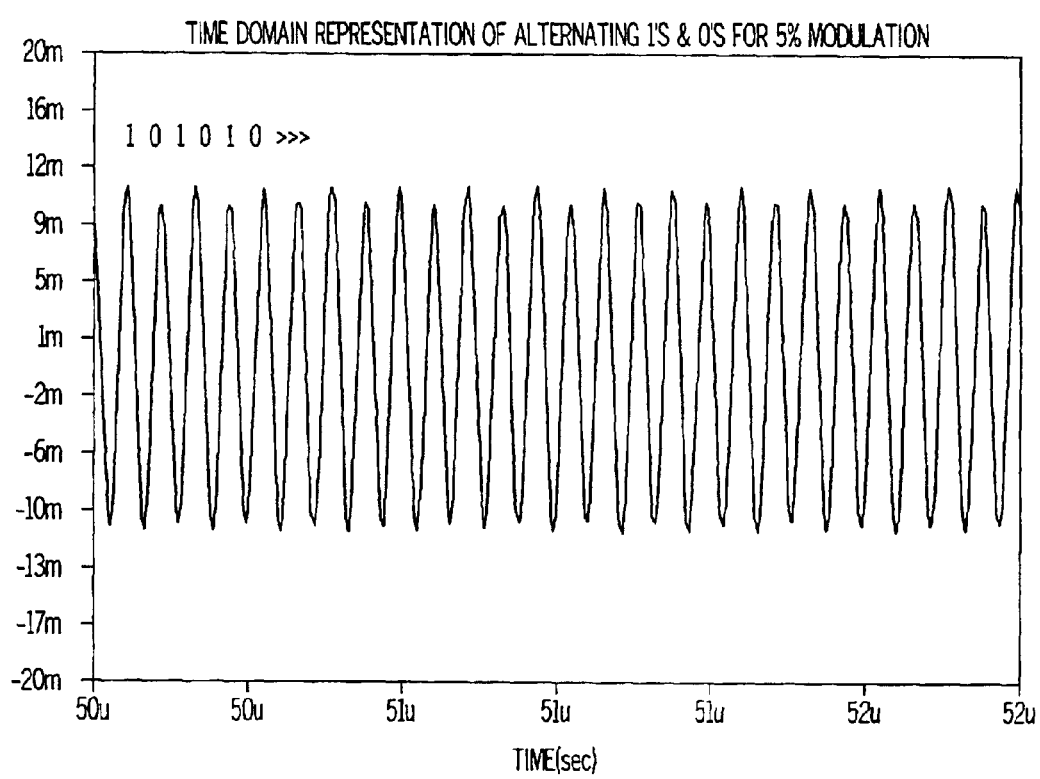
FIG. 1 is a diagram showing suppressed cycle modulation for alternating 1's & 0's (test pattern)

The wireless transmission of digital binary data streams in accordance with the instant invention is the concept of "suppressed cycle modulation" (SCM) wherein sinusoidal-defining wavelets on a RF carrier, each with a period representing 360°, are selectively amplitude suppressed to represent a select binary value. For example, the suppression of such a wavelet, or sequence of them, from an otherwise continuous carrier sequence of wavelets defining a carrier waveform may represent either a logic zero or logic one depending upon the protocol utilized. Because these wavelets are selectively suppressed by acting upon the carrier waveform at zero crossing positions, minimal side frequencies or sidebands are generated. These sidebands occur for only one RF cycle and the power contained in the sideband is very low. The RF signal and method of the invention can perform with a very narrowly allocated bandwidth that approaches the unmodulated carrier width itself. Thus, bandwidths assigned for this transmissional task are quite narrow, with data transmission speeds at the singular frequency of the RF carrier itself. This invention can send high speed data in RF channels that are very narrow and that would ordinarily be considered useful only for very low speed data or analog voice. This invention can also be used with multiple access systems.

The preferred embodiment RF signal and method of this invention is accomplished when the carrier is slightly amplitude modulated with a modulation signal that is equal in frequency to the carrier itself and the modulation always begins or ends upon the zero voltage crossing point of the RF cycle phase. The modulation is applied as a shift of the amplitude of any single cycle, each cycle representing a single bit of data. In the preferred embodiment, each individual RF cycle represents one bit of data. A single cycle of RF will either represent a "1" or "0" depending upon the amplitude of the cycle, relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely a cycle that is relatively lower in amplitude than other cycles in the bit stream might be considered a "0". By treating each individual RF cycle as a logical bit, information will be transmitted at a speed equal to the carrier frequency.

In the preferred embodiment the slight amplitude shift is performed at the zero voltage crossing point. This is done to minimize any sideband or harmonic radiation. Therefore, only RF carrier cycles of pure sinusoidal form are transmitted.

When a carrier is un-modulated it usually is considered to carry no information. However in SCM, the opposite is true. A carrier that has no modulation is considered to represent all "1's" or all "0's". The relative amplitude of each cycle is used to judge the binary representation intended by the transmitter. When a carrier is steady and un-modulated, it also generates no sidebands. Therefore, we can limit the discussion of sidebands to only those carrier cycles that are different in amplitude, one to another and are adjacent in sequence.

Consider for example the binary sequence "1111001". The first four "1's" will cause the carrier to consist of four RF cycles of relatively high amplitude, assuming a protocol of full amplitude cycles representing "1's". A steady carrier creates no sidebands so four "1's" are transmitted without sideband energy.

The transition of the fourth bit, a "1", to the fifth bit, a "0", will cause the fifth RF cycle to have a relatively lower amplitude, beginning exactly at the start of the cycle at the zero voltage point. This change of amplitude will generate one single cycle of RF sideband at some integer or fractional multiple of the carrier frequency. Since this sideband consists of one single cycle of RF energy at twice the carrier frequency, the power contained in this sideband is very low as compared to the power in the carrier. The power contained in that single cycle of sideband energy relative to the power of the carrier is determined by the ratio of the amplitude of the previous cycle to the amplitude of the current cycle. This is the modulation index.

The next bit is a "0". Since the previous bit was also a "0", there will be no transition of amplitude, thus no sideband.

Finally, the last bit is a "1", causing a relative shift in the amplitude of that corresponding RF cycle and a sideband again, consisting of one single RF cycle at some integer or fractional multiple of the carrier frequency. In this example, 7 bits of data were transmitted while radiating only 2 cycles of RF sideband.

Figure 2:
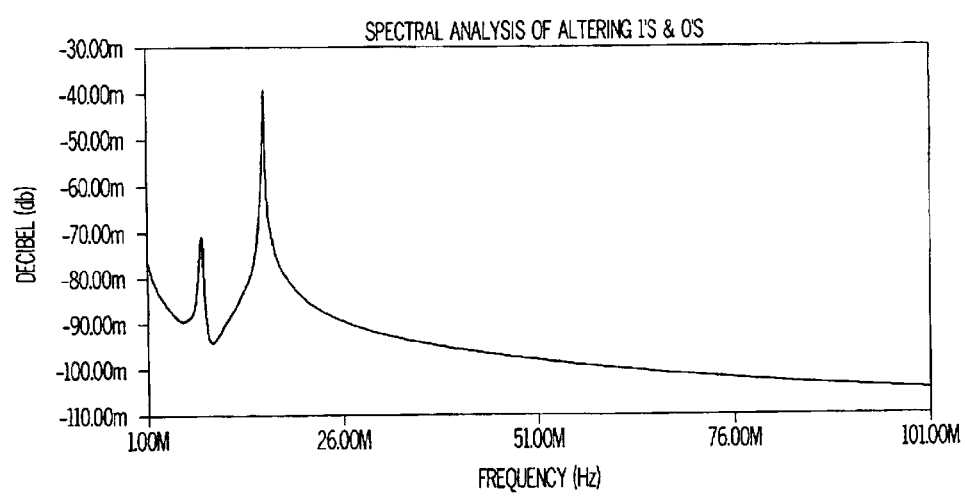
FIG. 2 is a diagram showing spectral analysis of alternating 1's & 0's for 5% suppressed cycle modulation.
Figure 5:
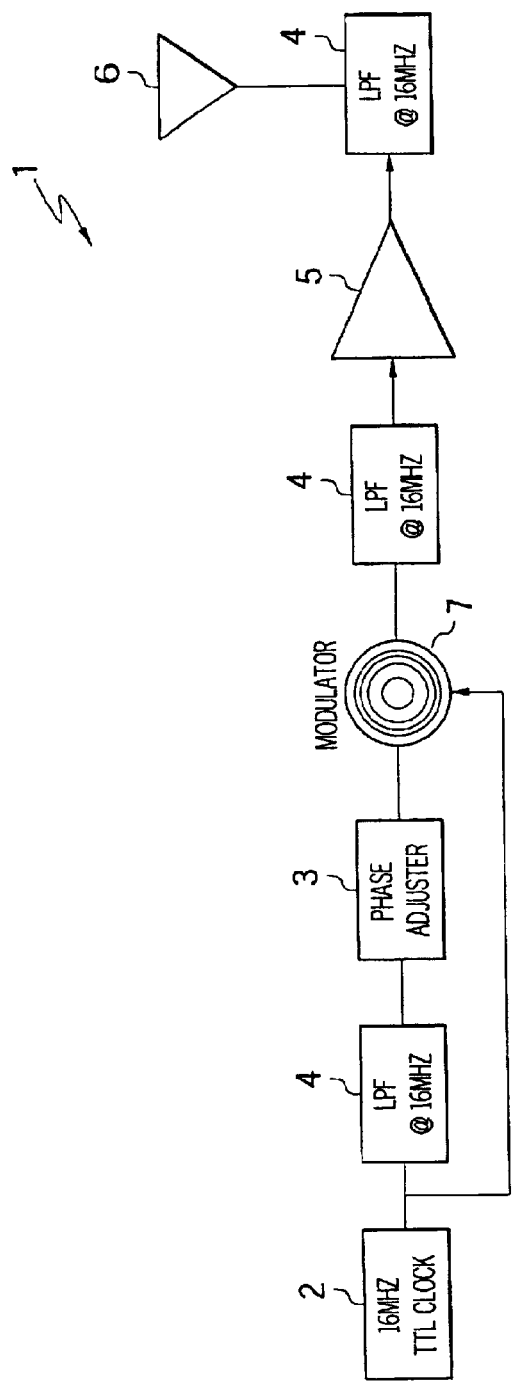
FIG. 5 is a block schematic diagram of a test pattern generator transmitting assembly employing an embodiment of suppressed cycle modulation.
Figure 6:
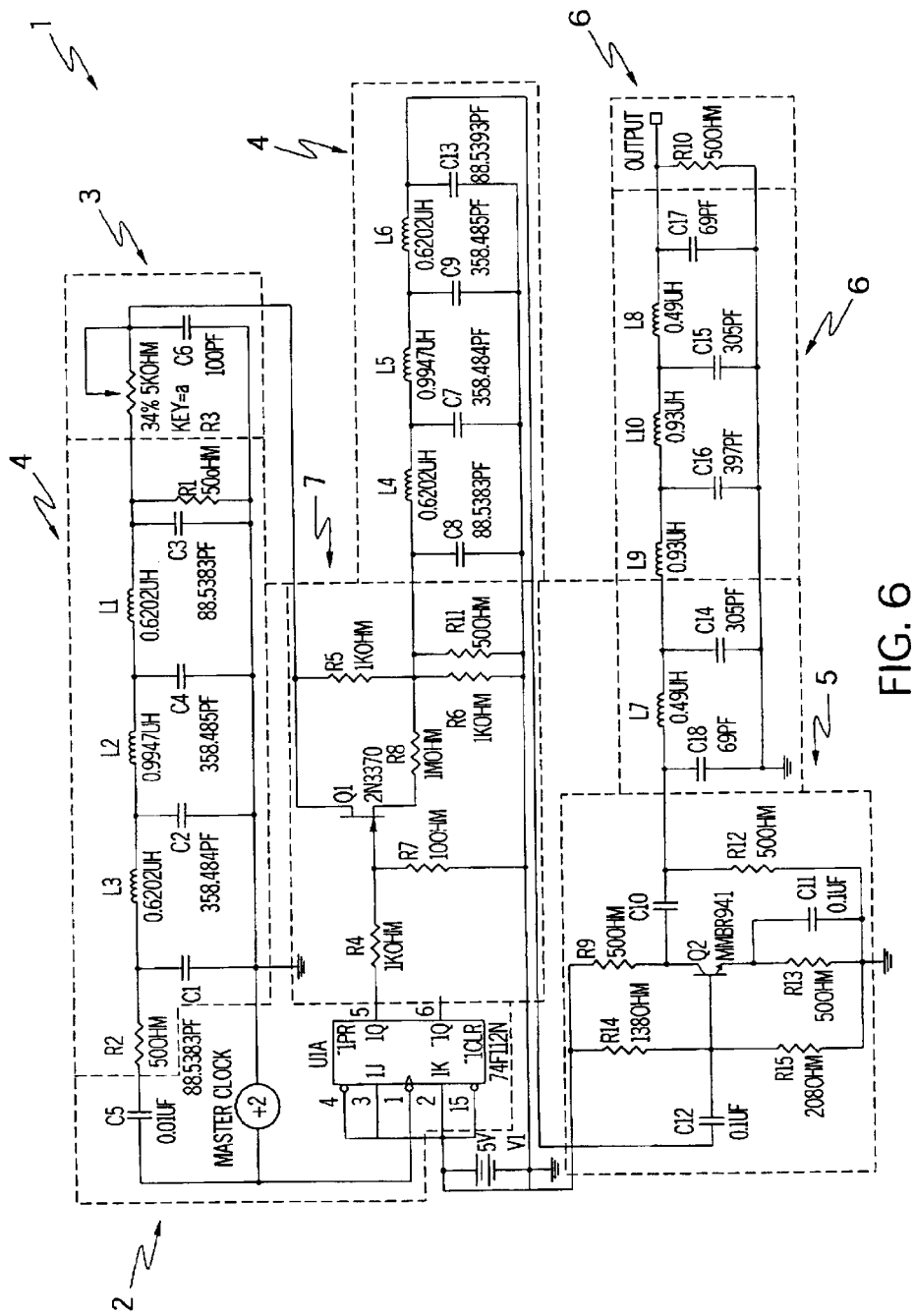
FIG. 6 is a schematic diagram of a test pattern generator transmitting assembly employing an embodiment of suppressed cycle modulation.

Looking now to FIG. 1, a representation of a suppressed cycle modulated RF signal is presented. The waveform shows a variation of carrier amplitude representing alternating digital values of "ones" and "zeros" from an otherwise continuously repetitive state. This is a worst-case scenario because the maximum amount of sideband energy to be radiated would happen when the binary data pattern consists entirely of alternating "1's" and "0's". The circuitry of the transmitter generating this waveform is shown in FIGS. 5 and 6. The spectral analysis of alternating "1's" and "0's" generated by the transmitter of this preferred embodiment is shown in FIG. 2. In this case there would be different relative amplitudes for each subsequent cycle resulting in two sidebands at ½ and 2× the carrier frequency (the upper sideband is filtered by low pass filters in the test pattern generating system shown in FIGS. 5 and 6).

Figure 3:
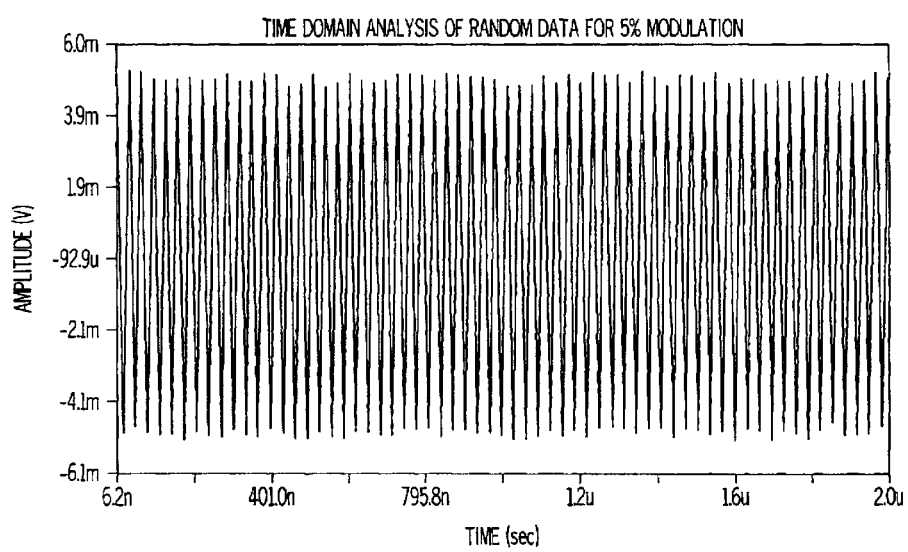
FIG. 3 is a diagram showing suppressed cycle modulation for random 1's & 0's.

Real data is random in nature, or at least not repetitious ad-infinitum, as shown by the waveform disclosed in FIG. 3. Since a single cycle of RF sideband energy can only exist during the transition from one binary state to another, any repeating "0's" or "1's" will reduce the average sideband power.

The following abbreviations and symbols are used to find the expression for the power in the carrier and in the sideband.

A=Amplitude of the carrier (Volts)

$P_C$=Discrete Carrier Power (Watts)

$P_{SB}$=Power in Sideband (Watts)

m=modulation index

R=Load connected at the output (Ω)

$f_c$=Carrier Frequency

The voltage expression for the unmodulated carrier is given as:

$$V = A \sin 2\pi f_c t \qquad \text{eq (1)}$$

The expression of the modulation envelope of the AM Signal is $A + mA\sin 2\pi f_m t$ Where $f_m$ is the frequency of the data to be transmitted
Voltage expression for the modulated signal is given as:

$$V'=(A+mA\sin 2\pi f_m t)\sin 2\pi f_c t \qquad \text{eq (2)}$$

$$V'=A\sin 2\pi f_c t + mA\sin 2\pi f_m t \sin 2\pi f_c t \qquad \text{eq (3)}$$

In case of Suppressed Cycle Modulation, the carrier and the data are at the same frequency, so substituting $f_c=f_m$ in equation (3) we get:

$$V'=A\sin 2\pi f_c t + mA\sin^2(2\pi f_c t) \qquad \text{eq (4)}$$

Since $\omega_c = 2\pi f_c$ $$V' = A\sin\omega_c t + \frac{mA}{2} - \frac{mA}{2}\cos 2\omega_c t \qquad \text{eq(5)}$$

From Equation (5), Discrete RMS Carrier power is given as:

$$P_c = A^2/2R \text{ (Watts)} \qquad \text{eq (6)}$$

RMS Power in Sideband is given as:

$$P_{SB} = m^2 A^2 / 8R \text{ (Watts)} \qquad \text{eq (7)}$$

In this equation, A and R are fixed, so the only thing that affects the power in sidebands is the modulation index 'm', so to have less power in sidebands, the modulation index needs to be lower.

Equation (7) can also be written as:

$$P_{SB} = \frac{m^2}{4}\left(\frac{A^2}{2R}\right)\text{(Watts)} \qquad \text{eq(8)}$$

Substituting equation (6) in equation (8), we get $$P_{SB} = \frac{m^2}{4} P_C \qquad \text{eq(9)}$$

$$\frac{P_{SB}}{P_c} = \frac{m^2}{4} \qquad \text{eq(10)}$$

In terms of dB:

$$P_{dB} = 10 \log(m^2/4) \text{ (dB)} \qquad \text{eq (11)}$$

Figure 4:
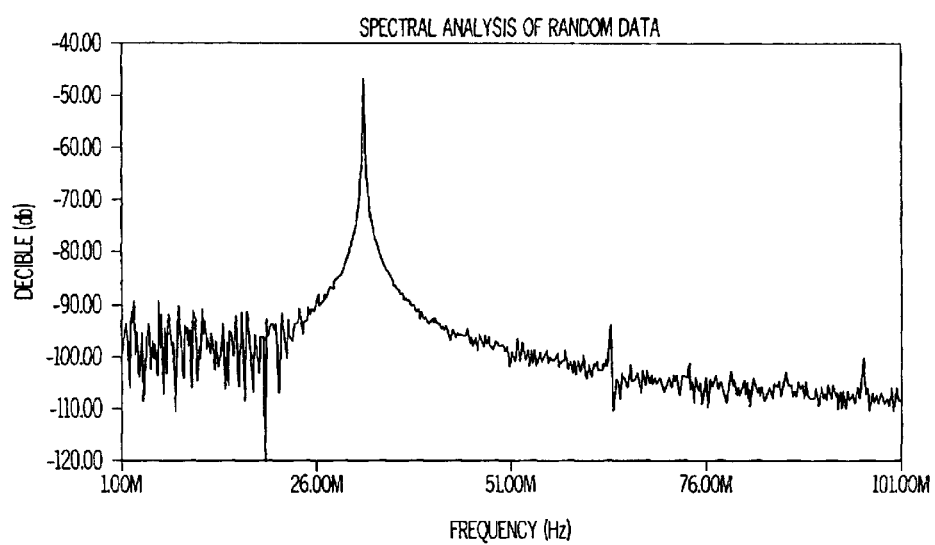
FIG. 4 is a diagram showing spectral analysis of random 1's & 0's for 5% suppressed cycle modulation.

Good results are obtained where the modulation index is small enough so that the power in sideband is at least 30 dB below the carrier. The spectral analysis of a random signal is shown in FIG. 4.

Looking to FIG. 5, a transmission station or assembly capable of generating and transmitting SCM is generally represented and denoted as 1. The transmitter (1) of FIG. 5 is used as a test pattern generator to transmit the carrier with alternating "1's" and "0's" and transmits the carrier at a frequency of 16 MHz. This circuit is but one embodiment of many various circuits that could generate and transmit the SCM signal and is used for the purpose of showing single cycle modulation is possible. Those skilled in the art will be able to design many variations of this and other circuitry that will generate and transmit the invented RF signal and method. The test station is formed with a local oscillator (2), or clock, which generates a carrier waveform at a select carrier frequency that is, in the test generator embodiment of this disclosure, 16 MHz. This type of standard oscillator is well known to those skilled in the art. Those skilled in the art will also recognize that any carrier frequency can be used with this modulation technique. As noted above, the RF carrier exhibits a waveform with a continuous sequence of wavelets, and the wavelets will be represented as sinusoids of at least 360° extent defined between crossover positions and commencing in a positive going sense.

A phase adjuster (3) is used to synchronize the carrier frequency with the modulating signal generated by the modulator (7), which would be the data stream to be transmitted. This allows the amplitude suppression to be performed precisely at the zero voltage crossing point of the carrier frequency. This minimizes any sideband or harmonic radiation. The phase adjusting (3) function may be carried out, for example, by a phase detector such as that marketed by Mini-Circuits, Inc. as a model MPD-21. A variety of high-speed operational amplifier implementations for detecting zero thresholds are available in the art.

Minimal sidebands are still generated using this method of modulation since the switching may not be perfectly synchronized to occur in conjunction with a zero crossing location. Therefore, in accordance with good engineering practice, filters (4) are employed to strip off any residual harmonics or spurious radiation otherwise generated due to switching imperfections. The thus filtered transmission output is provided to a radio frequency (RF) transmission assembly that is comprised of a Class A type of radio frequency amplifier (5) and a transmission antenna (6). Class A amplification is called for inasmuch as no ringing or tank circuit type of amplification implementation is desired which would tend to recreate sinusoid signals and potentially alter the suppressed nature of the carrier amplitude, which in this case would define digital data. This type of amplification and amplifiers, along with others that may perform in a similar manner, are well known to those skilled in the art.

The transmission station (1) generally will exhibit a capability for transmitting or broadcasting data at speeds, which are equal to the carrier frequency when using SCM transmission. For example, a one MHz RF carrier will transmit data at one Megabit Per Second (MBPS) where the system designer chooses to use a single wavelet to represent one bit of data.

Referring now to FIG. 6, a schematic diagram showing actual components implementing the block diagram of FIG. 5 is disclosed and would be easily replicated by anyone skilled in the art. The transmitter (1) is comprised of the following circuitry the description of which contains a more detailed disclosure of the components making up the circuits.

The local oscillator (2) is comprised of a Master Clock that generates a 16 MHz square wave. The 16 MHz square wave goes to a Low Pass filter (4) and to JK flip flop 74F112. C5 is used to block DC from the Master Clock. The Low Pass filter (4) is a seven-pole Butterworth filter and has a cutoff frequency of 16 MHz. C1, C2, C3, C4, L1, L2 and L3 forms the seven poles of the filter (4). The filter (4) is designed for a 50 Ohms input and a 50 Ohms output. R1 and R2 form a 50 Ohms input and a 50 Ohms output combination. This Low Pass filter (4) performs two functions: First it filters the square wave, and second, it converts the square wave into 16 MHz sine wave.

R3 and C6 form the phase adjuster (3) circuitry so that amplitude suppression in the cycles begins at zero crossings. The JK Flip flop 74F112 that receives the signal from the Master Clock is configured in a "divide by two" mode. The output of this flip flop is an 8 MHz square wave.

R5, R6, and R8, together with Q1 form the suppressed cycle modulator (7). R4 and R7 are the biasing resistors for Q1. The output of the modulator (7) feeds into another 7 pole Butterworth Low Pass filter (4). C7, C8, C9 C13, L4, L5, and L6 form the seven poles of the filter (4). This filter (4) has a cutoff frequency of 16 MHz. C12 is another blocking capacitor connected between this filter (4) and the Class A Amplifier.

The Class A amplifier (5) is made with transistor Q2 which is an MMBR941. R15 and R14 are used as biasing resistors for Q2, whereas R9, R13, and C11 provide gain to this amplifier (5). The output of this amplifier (5) is taken from the collector of Q2. A 50 Ohm load resistor, R12, is connected at the output with a blocking capacitor C10.

The output of this Class A amplifier (5) goes to 9 pole butterworth low pass filter (4) having a cutoff frequency of 16 MHz. C14, C15, C16, C17, C18, L7, L8, L9, and L10 form the 9 poles of the filter (4). The output of the filter (4) is matched to a 50 Ohm resistor, R10, and is fed to the antenna (6).

Figure 7:
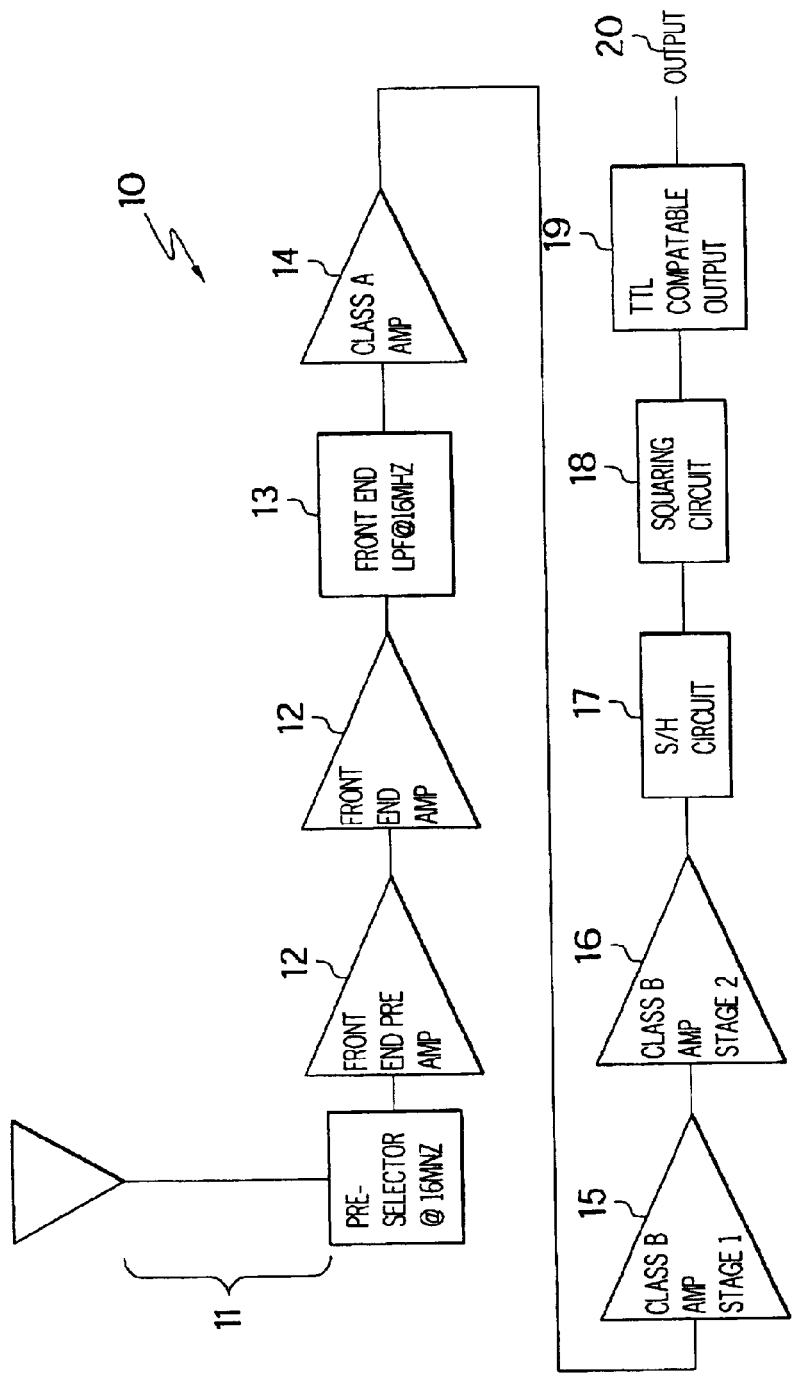
FIG. 7 is a block schematic diagram of a receiving assembly or station employing an embodiment of suppressed cycle modulation; and, FIG. 8 is a schematic diagram of a receiving assembly employing an embodiment of suppressed cycle modulation.

Looking to FIG. 7, a receiver station or assembly for receiving the test pattern is generally represented and denoted as 10. The receiver (10) of FIG. 7 is used to demonstrate that it is possible to receive the carrier with SCM binary digital signals of alternating "1's" and "0's at a frequency of 16 MHz and output them as a TTL compatible serial data stream.

The receiver (10) is comprised of the following circuits: A Pre-selector (11) that consists of a tuned antenna and a series tuned circuit that will reject signals outside the desired pass band; a front end pre-amp (12) made up of two Class A type of RF amplifiers to amplify the received signal; a low pass filter (13) to eliminate any unwanted signals; an additional class A amplifier (14) for further amplification; a Class B amplifier (15) that performs as a high-speed rectifier and amplifier without the diode voltage drop which would be associated with typical rectifier/detector circuits. This circuit acts to isolate or "clip" the positive voltage portion of the signal waveform and to provide amplification of that portion of the signal; a Class B amplifier second stage (16) that performs the similar function as the previous class B amplifier (15) with the overall effect being to amplify the difference between the "1" signal level and the "0" signal level allowing for easier differentiation between the two logic states; a sample and hold circuit (17) that receives the signal, rectifies the signal and results in a filtered pulse, which represents RF pulses of the higher amplitude and excludes those of the lower amplitude, thus differentiating between the two logical states insinuated by this particular modulation scheme; a squaring amplifier (18), which is a class B amplifier that essentially is an "overdriven" amplifier such that this amplifier receives the single binary pulses from the sample and hold circuit (17) and amplifies them to or near the supply voltage, thus clipping at the maximum supply voltage acting to clean up the signal pattern and provide a squarer signal; a TTL compatible output (19) that performs additional squaring, inversion of the signal logic twice, resulting in the original logic polarity after two stages of squaring; and finally, a load (20) for the output of the receiver (10) for testing purposes.

Figure 8A:
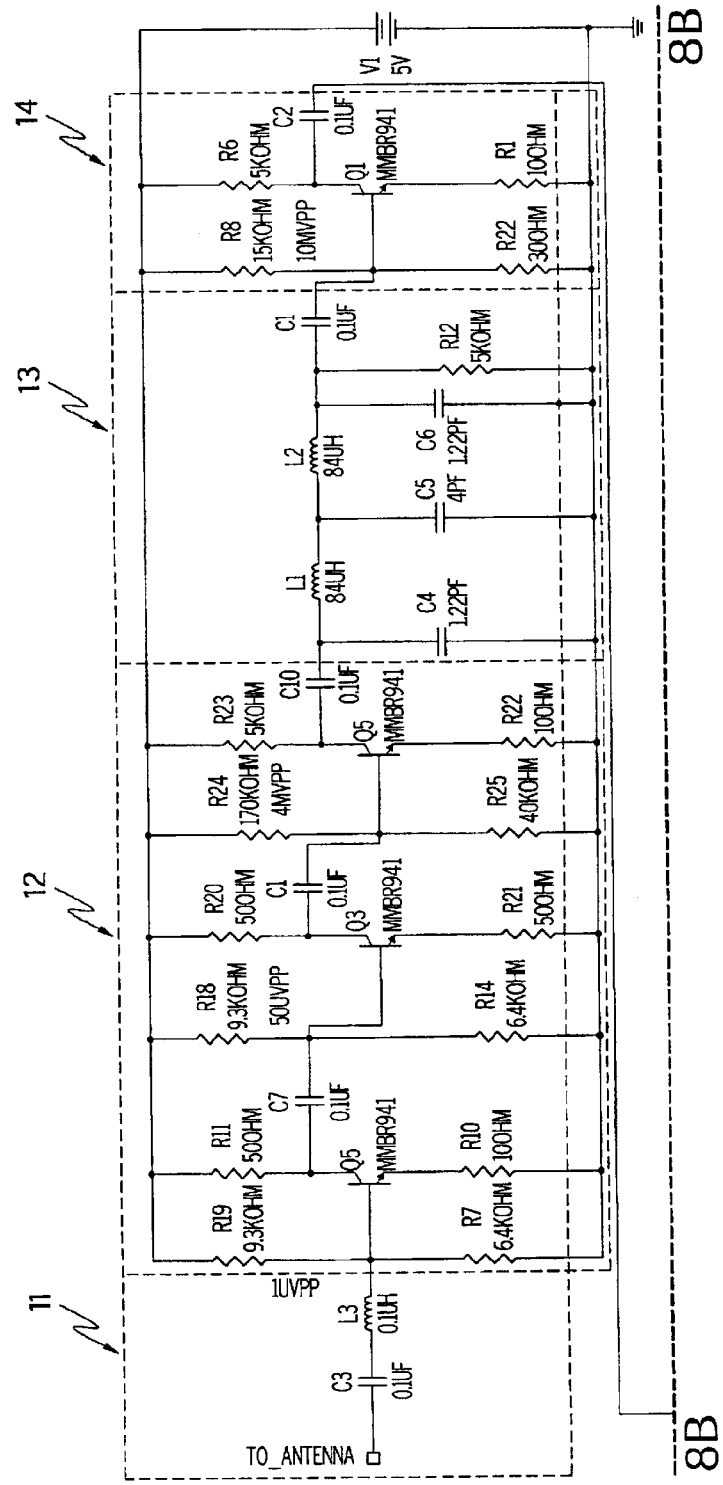
Figure 8B:
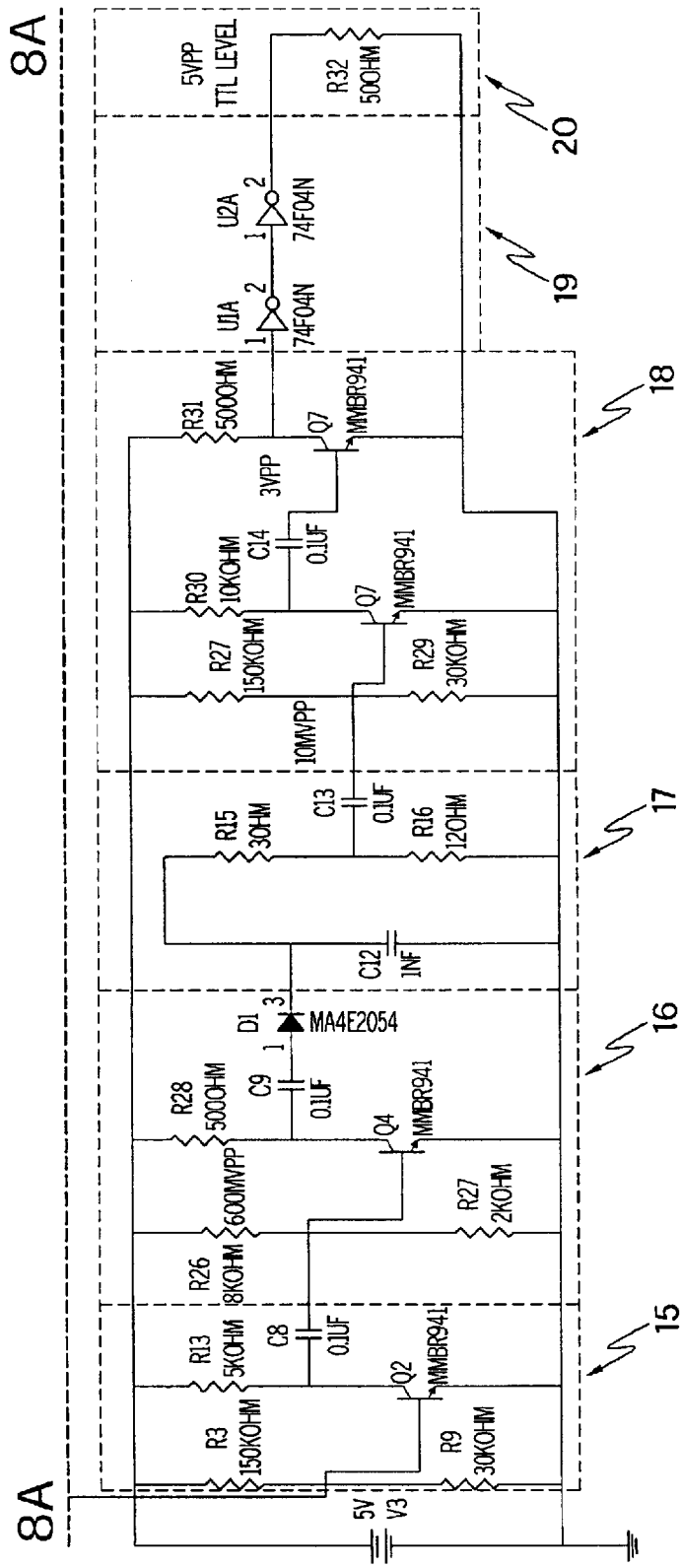

FIGS. 8A and 8B disclose the schematic diagram of the circuitry implementing the block diagram of FIG. 7 in sufficient detail such that anyone skilled in the art would be capable of building one. The receiver (10) of this test pattern embodiment is designed and implemented in the circuitry disclosed in FIGS. 8A and 8B to receive SCM binary digital signals and output them as a TTL compatible serial data stream. The receiver (10) is comprised of the following circuitry the description of which contains a more detailed disclosure of the components making up the circuits.

As disclosed in FIG. 8A the pre-selector (11) consists of the tuned antenna along with C3 and L3. C3 and L3 comprise a series tuned circuit that will reject signals outside the desired pass band.

The front end pre-amplifier (12) amplifies the desired signal. R19 and R7 comprise Class A biasing for Q5, a bi-polar transistor. R11 is the load resistor and R10 is the emitter resistor, providing gain reduction and negative self-biasing. Coupling to Q3 is provided by C7. R18 and R14 provide class A biasing for Q3. R20 is the load resistor and R21 provides negative self-biasing.

C11 provides AC coupling from Q3 to Q6, another Class A amplifier (12). As in the previous amplifier (12), R24 and R25 provide Class A biasing for Q6 while R23 acts as a load resistor and R22 provides negative biasing.

C10 couples the signal to the Low Pass Filter (13) comprised of L1, L2, C4, C5 and C6. R12 adds loading to the filter (13) to assist in control of the filter (13).

C1 Couples the signal out of the LPF into a Class A amplifier (14) comprised of biasing resistors R8, R2, transistor Q1, load resistor R6, and emitter resistor R1.

FIG. 8B shows the first stage Class B amplifier (15) that performs as a high-speed rectifier and amplifier without the diode voltage drop that normally would be associated with typical rectifier/detector circuits. R3 and R9 bias Q2 to Class B operating mode. R13 acts as a load resistor. This circuit acts to isolate or "clip" the positive voltage portion of the signal waveform and to provide amplification of that portion of the signal.

The second stage Class B amplifier (16) performs the similar function as the previous Class B amplifier (15). Overall, the effect will be to amplify the difference between the "1" signal level and the "0" signal level allowing for easier differentiation between the two logic states. C8 couples the signal from stage one to stage two where R26 and R27 bias Q4 into Class B operation. R28 acts as the load resistor for Q4.

The sample and hold circuit (17) receives the signal through C9 and D1. D1 rectifies the signal and charges C12 in only the positive polarity. R15 and R16 comprise a bleeder/discharge path for C12 while also comprising a scaling or voltage divider circuit from which the now filtered signal is coupled. D1 also reduces the amplitude of those signal pulses that occur when the signal is at the reduced level mode. Overcoming the voltage drop imposed by D1 results in coupling of signals only large enough to do so, generally those representing binary "1's" if that particular logic representation is used. The result will be a filtered pulse, which is imposed upon C13, which represents RF pulses of the higher amplitude and excludes those of the lower amplitude, thus differentiating between the two logical states insinuated by this particular modulation scheme.

The squaring amp (18) is a Class B amplifier that essentially is an "overdriven" amplifier. This squaring amplifier (18) receives the single binary pulses from the sample and hold circuit (17) and amplifies them to or near the supply voltage, thus clipping at the maximum supply voltage. This acts to clean up the signal pattern and provide a squarer signal to the TTL compatible output circuitry (19).

The TTL compatible output circuitry (19) prepares the signal for output. U1A and U2A, both binary Schmitt triggers/inverters, and the resistor R32 perform additional squaring, inverting the signal logic twice, resulting in the original logic polarity after two stages of squaring. R32 provides a 50 ohm load for the output (20) of the receiver (10) for testing purposes.

As shown by the simplicity of the test pattern transmitter (1) and receiver (10), Suppressed Cycle Modulation (SCM)

is a simple and innovative RF signal and modulation technique that is also fully compatible with present multiple access techniques (like FDMA and TDMA).

Some of the advantages of this RF signal and modulation scheme, particularly when used with multiple access techniques, are:

a. Theoretically nearly zero bandwidth per channel.
b. High-speed data transmission.
c. Separation between channels (also known as Guard Band) is small.
d. Allows large number of users to share information at the same time.
e. Interference between adjacent channels is theoretically negligible.
f. SCM can also be used to transmit digital voice and video at a high speed.
g. SCM system can be implemented for any RF Band (e.g. UHF, VHF etc..)
h. SCM supports frequency division duplex (FDD) paired bands with a difference of few MHz between transmitting and receiving frequencies.
i. SCM supports TDMA as well as FDMA multiplexing techniques.
j. SCM can support spread spectrum frequency hopping techniques Because of the above-mentioned inherent advantages, SCM when used in conjunction with FDMA or TDMA guarantees high-speed data transmission to multiple simultaneous users.

When used in FDMA mode, each user is assigned a particular carrier frequency to transmit/receive their information. Therefore, since the bandwidth requirement for a channel to transmit (or receive) high-speed data is low, hundreds or thousands of channels can be accommodated within a narrow spectral band. SCM in FDMA mode allows the user to use the channel 100% of the time.

When used in TDMA mode, multiple users share the common frequency band and they are required to transmit their information at different time slots within the carrier. Data is transmitted and received in bursts. These bursts are reassembled at the receiver (or base station) to provide continuous information. Since the data transmission speed is the same as the carrier speed in SCM, this process of transmitting/receiving bursts of data appears continuous.

Like CDMA, the SCM method has negligible interference from adjacent channels. But CDMA performance decreases as the system approaches its capacity (i.e., as the number of users increase, each user must transmit more power). This creates a coverage problem for CDMA. Thus, CDMA requires a tradeoff between maximum capacity and maximum coverage. The SCM system performance does not decrease with an increase in the number of users in a multiple access system. This is because when the SCM system is used in FDMA mode, each user will have its own carrier, and when the SCM system is used in TDMA mode, each user is allowed to transmit/receive in its particular time slot only. Thus capacity and coverage problems in SCM are negligible.

Since certain changes may be made in the above described RF signal and method without departing from the scope of the invention herein involved, it is intended that all matter contained in the description thereof or shown in the accompanying drawings shall be interpreted as illustrative and not in a limiting sense.

What is claimed is:

1. A modulated radio frequency carrier capable of transmitting a binary information stream made up of first and second binary states comprising:

a carrier frequency waveform made up of a continuous sequence of wavelets;

said wavelets being defined by a 360 degree cycle between crossover positions; said crossover positions representing a substantially zero energy level; and, said wavelets having been modulated in accordance with said information stream by having suppressed the amplitude of an integer number of said wavelets corresponding to said first binary states of said information stream and not having suppressed the amplitude of an integer number of said wavelets corresponding to said second binary states of said information stream thereby generating a modulated radio frequency carrier such that said modulated radio frequency carrier is capable of being transmitted and received and said first binary states and said second binary states can be demodulated from said modulated radio frequency carrier by detecting the respective amplitudes of said wavelets and said binary data sequence can be reconstructed resulting in regeneration of said information stream.

2. The modulated radio frequency carrier of claim 1 wherein:

any harmonics of said modulated radio frequency carrier that were generated when said wavelets were suppressed have been reduced by filtering.

3. The modulated radio frequency carrier of claim 1 wherein:

said wavelets are modulated in accordance with said information stream by having suppressed the amplitude an integer number of said wavelets corresponding to said first binary states of said information stream to a substantially zero energy level.

4. A method for transmitting binary information from a binary information stream over a radio frequency carrier comprising the steps of:

generating a radio frequency carrier at a select carrier frequency such that said radio frequency carrier has a waveform with a continuous sequence of wavelets with similar amplitudes;

said wavelets being defined by a 360 degree cycle between crossover positions of said radio frequency carrier waveform;

said crossover positions representing a substantially zero energy level;

receiving said information stream as a binary data sequence of first and second binary states;

modulating said radio frequency carrier in accordance with said binary data sequence by suppressing the amplitude of an integer number of said wavelets corresponding to said first binary states to derive first carrier binary signals and not suppressing the amplitude of an integer number of said wavelets corresponding to said second binary signals to derive second carrier binary states thereby generating a suppressed cycle modulated carrier made up of said first carrier binary signals and said second carrier binary signals; and, broadcasting said suppressed cycle modulated carrier such that a suppressed cycle modulated radio frequency signal is generated and said suppressed cycle modulated radio frequency signal is capable of being received and said first binary states and said second binary states can be demodulated from said suppressed cycle modulated radio frequency carrier by detecting the respective amplitudes of said wavelets and said binary data sequence can be reconstructed resulting in regeneration of said information stream.

5. The method of claim 4 wherein:

the modulating of said radio frequency carrier is carried out by suppressing the amplitude of said wavelets while minimizing sideband distortions of said radio frequency carrier.

6. The method of claim 4 wherein:

the generation of said radio frequency carrier is accomplished by a local oscillator having an oscillator output at a select carrier frequency.

7. The method of claim 4 comprising the additional step of:

reducing of harmonics from said suppressed cycle modulated carrier by filtering said suppressed cycle modulated carrier.

8. The method of claim 4 wherein:

broadcasting said suppressed cycle modulated carrier is accomplished using a Time Division Multiple Access system such that Time Division Multiple suppressed cycle modulated radio frequency signals are broadcasted.

9. The method of claim 4 wherein:

broadcasting said suppressed cycle modulated carrier is accomplished using a Frequency Division Multiple Access system such that Frequency Division Multiple suppressed cycle modulated radio frequency signals are broadcasted.

10. The method of claim 4 wherein:

said wavelets are modulated in accordance with said information stream by having suppressed the amplitude an integer number of said wavelets corresponding to said first binary states of said information stream to a substantially zero enemy level.

11. A method for receiving radio frequency transmitted binary information that was derived from a binary information stream composed of a binary data sequence of first and second binary states that was modulated onto a radio frequency carrier which bas a waveform with a continuous sequence of wavelets with similar amplitudes defined by a 360 degree cycle between crossover positions representing a substantially zero energy level in which the radio frequency carrier has been modulated in accordance with said binary data sequence by suppressing the amplitude of said wavelets corresponding to said first binary states to derive first carrier binary signals and not suppressing the amplitude of said wavelets corresponding to said second binary states to derive second carrier binary signals thereby generating a suppressed cycle modulated carrier made up of said first carrier binary signals and said second carrier binary signals such that a suppressed cycle modulated radio frequency signal was generated and broadcasted comprising the steps of:

receiving said suppressed cycle modulated radio frequency signal through an antenna responsive to said radio frequency carrier signal;

extracting said suppressed cycle modulated carrier from said suppressed cycle modulated radio frequency signal received by said antenna;

demodulating said suppressed cycle modulated carrier by detecting the respective amplitudes of said wavelets to identify said first binary states and said second binary states corresponding with said first carrier binary signals and said second carrier binary signals; and, reconstructing said binary data sequence from said first binary states and said second binary states resulting in regeneration of said information stream.

12. The method of claim 11 wherein:

broadcasting and receiving said suppressed cycle modulated carrier is accomplished using a Time Division Multiple Access system such that Time Division Multiple suppressed cycle modulated radio frequency signals are broadcasted and received.

13. The method of claim 11 wherein:

broadcasting and receiving said suppressed cycle modulated carrier is accomplished using a Frequency Division Multiple Access system such that Frequency Division Multiple suppressed cycle modulated radio frequency signals are broadcasted and received.

14. The method of claim 11 wherein:

said wavelets are modulated in accordance with said information stream by having suppressed the amplitude an integer number of said wavelets corresponding to said first binary states of said information stream to a substantially zero energy level.

15. A method for transmitting binary information from a binary information stream over a radio frequency carrier, receiving the radio frequency carrier, and converting the transmitted binary information back into an information stream comprising the steps of:

generating a radio frequency carrier at a select carrier frequency such that said radio frequency carrier has a waveform with a continuous sequence of wave lets with similar amplitudes;

said wavelets being defined by a 360 degree cycle between crossover positions of said radio frequency carrier waveform;

said crossover positions representing a substantially zero energy level;

receiving said information stream as a binary data sequence of first and second binary states;

modulating said radio frequency carrier in accordance with said binary data sequence by suppressing the amplitude of said wavelets corresponding to said first binary states to derive first carrier binary signals and not suppressing the amplitude of said wavelets corresponding to said second binary states to derive second carrier binary signals thereby generating a suppressed cycle modulated carrier made up of said first carrier binary signals and said second carrier binary signals;

broadcasting said suppressed cycle modulated carrier such that a suppressed cycle modulated radio frequency signal is generated;

receiving said suppressed cycle modulated radio frequency signal through an antenna responsive to said radio frequency carrier signal;

extracting said suppressed cycle modulated carrier from said suppressed cycle modulated radio frequency signal received by said antenna;

demodulating said suppressed cycle modulated carrier by detecting the respective amplitudes of said wavelets to identify said first binary states and said second binary states corresponding with said first carrier binary signals and said second carrier binary signals; and, reconstructing said binary data sequence from said first binary states and said second binary states resulting in regeneration of said information stream.

16. The method of claim 15 wherein:

the modulating of said radio frequency carrier is carried out by suppressing the amplitude of said wavelets while minimizing sideband distortions of said radio frequency carrier.

17. The method of claim 15 wherein:

the generation of said radio frequency carrier is accomplished by a local oscillator having an oscillator output at a select carrier frequency.

18. The method of claim 15 comprising the additional step of:

reducing of harmonics from said suppressed cycle modulated carrier by filtering said suppressed cycle modulated carrier.

19. The method of claim 15 wherein:

broadcasting and receiving said suppressed cycle modulated carrier is accomplished using a Time Division Multiple Access system such that Time Division Multiple suppressed cycle modulated radio frequency signals are broadcasted and received.

20. The method of claim 15 wherein:

broadcasting and receiving said suppressed cycle modulated carrier is accomplished using a Frequency Division Multiple Access system such that Frequency Division Multiple suppressed cycle modulated radio frequency signals are broadcasted and received.

21. The method of claim 15 wherein:

said wavelets are modulated in accordance with said information stream by having suppressed the amplitude an integer number of said wavelets corresponding to said first binary states of said information stream to a substantially zero energy level.

* * * * *